United States Patent [19]

Murakami

[11] Patent Number: 4,646,899
[45] Date of Patent: Mar. 3, 1987

[54] TORSION DAMPER DISC

[75] Inventor: Kiyoharu Murakami, Neyagawa, Japan

[73] Assignee: Kabushiki Kaisha Daikin Seisakusho, Osaka, Japan

[21] Appl. No.: 688,652

[22] Filed: Jan. 3, 1985

[30] Foreign Application Priority Data

Jan. 6, 1984 [JP] Japan .................................. 59-1056

[51] Int. Cl.$^4$ .............................................. F16D 3/52
[52] U.S. Cl. .............................. 192/106.1; 192/70.17; 464/55; 474/271
[58] Field of Search ........................ 192/106.1, 70.17; 464/55, 56; 474/264, 271

[56] References Cited

U.S. PATENT DOCUMENTS

| | | | |
|---|---|---|---|
| 1,522,980 | 1/1925 | Roco et al. | 464/56 X |
| 1,723,886 | 8/1929 | Pfaff | 192/70.17 |
| 2,167,384 | 7/1939 | Freedlander | 474/271 X |
| 2,858,855 | 11/1958 | Picanol | 464/55 X |
| 3,479,892 | 11/1969 | Cicognani | 474/264 |
| 4,266,409 | 5/1981 | Kutsch | 464/55 |
| 4,296,854 | 10/1981 | Staub, Jr. | 192/106.1 |
| 4,300,363 | 11/1981 | Mathues | 192/106.1 X |
| 4,300,670 | 11/1981 | Mathues | 192/106.1 |
| 4,342,806 | 8/1982 | Kutsch | 464/55 X |
| 4,378,220 | 3/1983 | Seppala et al. | 464/55 |

FOREIGN PATENT DOCUMENTS

| | | | |
|---|---|---|---|
| 324296 | 4/1919 | Fed. Rep. of Germany | 464/55 |
| 1197696 | 7/1965 | Fed. Rep. of Germany | 464/55 |
| 2733880 | 2/1978 | Fed. Rep. of Germany | 192/106.1 |
| 394602 | 8/1973 | U.S.S.R. | 464/55 |

Primary Examiner—Rodney H. Bonck
Assistant Examiner—Richard M. Lorence
Attorney, Agent, or Firm—Armstrong, Nikaido, Marmelstein & Kubovcik

[57] ABSTRACT

A torsion damper disc including a disc plate approximately perpendicular to a center line of a central hub and rotatably supported by the central hub having an outward flange; characterized by that plural stopping parts are provided on one of the flange and the disc plate and pressing parts disposed between the stopping parts in a circumferential direction of the disc are provided on the other thereof respectively, a flexible member is laid over and between the stopping parts, the pressing parts are pressed on the flexible member laid between the stopping parts, and a tension of the flexible member is made elastically changeable by interposing an elastic member in at least any one of spaces between the stopping part, the pressing part and the flexible member.

6 Claims, 5 Drawing Figures

TORSION DAMPER DISC

FIELD OF THE INVENTION

This invention relates to a torsion damper disc of a type wherein a disc plate is rotatably supported by a central hub and is mainly suitable for an automobile clutch disc.

DESCRIPTION OF THE PRIOR ART

As a damper disc suitable for an automobile clutch disc, a construction utilizing a coil spring or a rubber-like elastic body as shown for example in FIG. 1 has been known. In FIG. 1, a central hub 1 integrally has an annular flange 2 and fits onto an output shaft (not shown) through a spline 3 provided on an inner peripheral surface thereof. A disc plate 4 parallel with the annular flange 2 is rotatably supported by the hub 1, and a facing 5 secured to an outer periphery of the plate 4 is so designed as to be sandwiched between a driving side flywheel and a pressure plate (both not shown). Plural holes 6 are made on the plate 4 on the same circumference and holes 7 are also made on the corresponding annular flange 2. A circumferential compression coil spring 8 or a rubber-like elastic body 9 is installed in each pair of the holes 6 and 7.

In the above conventional design, it is necessary to form the holes 6 and 7 long in the circumferential direction in order to improve a vibration absorbing performance by setting a maximum twist angle large. However, forming the holes 6 and 7 large will cause a disadvantage of insufficiency in strengths of the flange 2 and the disc plate 4, and further it is impossible to set the twist angle extremely large from the viewpoint of a space.

SUMMARY OF THE INVENTION

Object of the Invention

An object of this invention is to provide a torsion damper disc in which a large twist angle can be obtained without impairing strengths of a flange of a hub or a disc plate and which has a high vibration absorbing performance.

Composition of the Invention

This invention relates to a torsion damper disc, wherein a disc plate approximately perpendicular to a center line of a hub is rotatably supported by the central hub having an outward flange, including the following requirements.

(a) Plural stopping parts are provided on one side of the flange and the disc plate, and pressing parts disposed between the stopping parts in the circumferential direction of the disc are provided on the other side thereof, respectively.

(b) A flexible member is laid over and between the stopping parts.

(c) The pressing parts are pressed on the flexible member laid between the stopping parts.

(d) A tension of the flexible member is made elastically changeable by interposing an elastic member in at least any one of spaces between the stopping part, the pressing part and the flexible member.

DETAILED DESCRIPTION OF THE INVENTION

Figure 1:
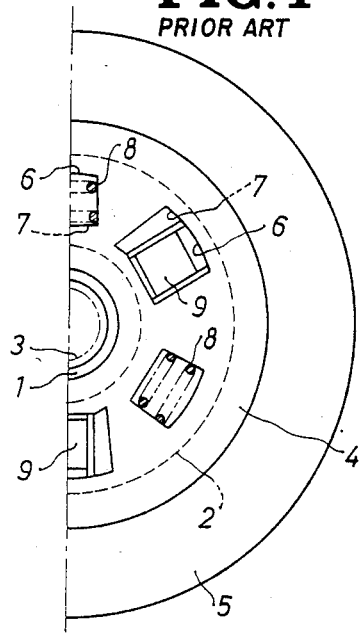
FIG. 1 is a partial elevation view of a conventional damper disc.
Figure 3:
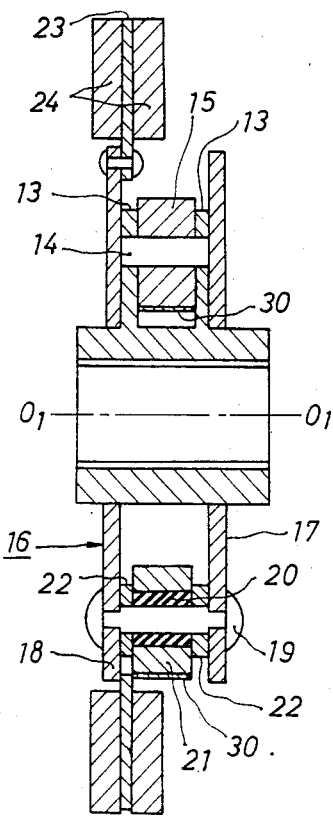
FIG. 3 and FIG. 4 are sectional views taken on lines III—III and IV—IV of FIG. 2, respectively.
Figure 2:
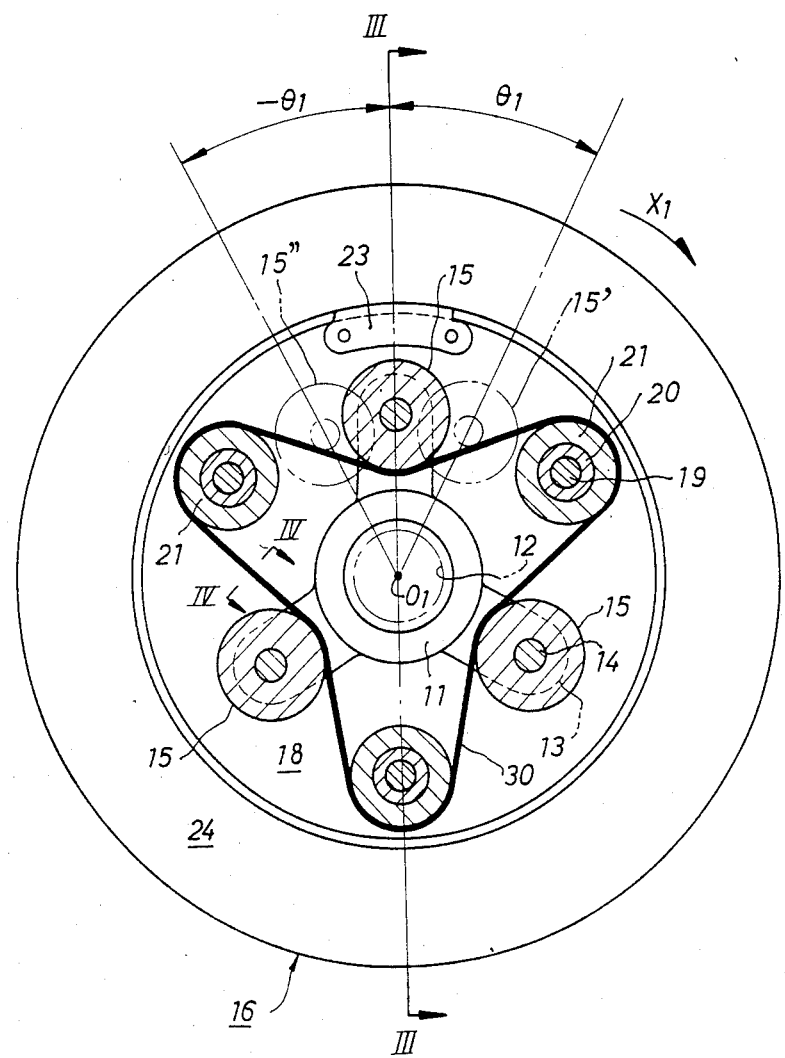
FIG. 2 is a vertical sectional elevation view of a damper disc according to the present invention.

FIG. 2 is a schematic elevation view of a case where the damper disc according to the present invention is employed in an automobile clutch. A central hub 11 has on its inner peripheral surface a spline 12 to fit onto an output shaft, and flanges 13 projecting radially in three directions are integrally formed on an outer peripheral surface of the hub. The three flanges 13 each consist 13,13, FIG. 3 of two pieces opposing each other spaced apart in the direction of a center line $O_1$—$O_1$ as shown in FIG. 3. A pin 14 parallel to the center line $O_1$—$O_1$ is installed between each pair of flanges 13 and 13, and a roller 15 fits rotatably onto the pin 14. A disc plate 16 parallel with the flange 13 is rotatably fitted onto and supported by the outer peripheral surface of the hub 11. A retaining plate 17 and a clutch plate 18, composing the plate 16, confront each other opposite sides of flange 13,13, and are interconnected integrally by means of a pin 19 parallel with the center line $O_1$—$O_1$. A roller 21 fits onto a central part of the pin 19 through a cylindrical elastic body 20 (for example, a rubber). A spacer 22 having a thickness corresponding to that of the flange 13 is interposed between the roller 21 and the plates 17 and 18. An inner periphery of a cushioning plate 23 projecting radially is securely fixed to an outer periphery of the clutch plate 18, and a facing 24 is secured to either side of the plate 23.

Figure 4:
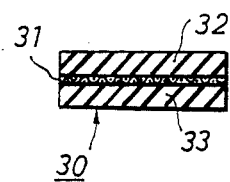

As shown in FIG. 2, pins 19 with elastic bodies 20 and rollers 21, are provided at three equally spaced places on plates 17,18 at the same circumference. An inner peripheral side of an annular continuous steel belt 30 is laid over each roller 21, and under each roller 15. Belt 30 is pressed down by the roller 15 between rollers 21 and held in a condition bent toward the hub 11 side. As best shown in FIG. 4, belt 30 is made up of thin wires formed into a braided band 31 as a core material 31 with elastic bodies 32 and 33 (for example, rubbers) molded to both surfaces of core 31. The thickness of the core material 31 is as small as 0.6 mm and the total thickness of the belt 30 is approximately 5 mm. Accordingly, the belt 30 has a flexibility and, at the same time, its surface has an elasticity.

Now, the operation of the damper disc of the present invention will be described. As torsion between the disc plate 16 and the hub 11 is relative, it may be considered for the convenience of explanation that the plate 16 is fixed and the hub 11 is subjected to a twist torque in a direction of $X_1$. FIG. 2 shows a neutral condition which is stable because a tension of the steel belt is minimum, i.e. the rollers 15 are disposed at a circumferentially central position between rollers 21. When the hub 11 begins to twist relatively to the plate 16 in direction of $X_1$, the rollers 15 rolls on the outer peripheral surface of the steel belt 30 toward rollers 21 in the direction of $X_1$. As roller 15 comes near to the roller 21, the belt 30 is strongly pressed. The elastic bodies 32 and 33 (FIG. 4) of the belt 30 are compressed. The elastic body 20 is also compressed in such a direction as to move the roller 21 toward the disc center. When the roller 15 reaches a position of phantom line 15' and contacts the roller 21 through the belt 30, the twist will not progress any more. Twist angle $\theta_1$ at this moment, FIG. 2, corresponds to the maximum twist angle. When the twist torque is removed, the roller 15 will be returned to the neutral position by elastic forces of the elastic bodies 20, 32 and 33. A hysteresis torque is generated to absorb vibration energy due to internal friction etc. produced in the elastic bodies 20, 32 and 33 on the basis of the above twist motion.

Figure 5:
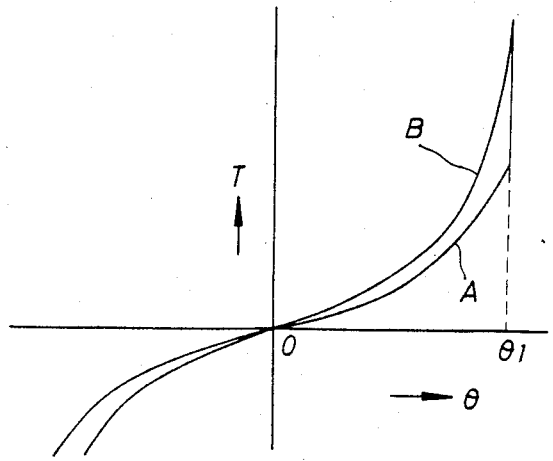
FIG. 5 is a graph showing a twist-angle/twist-torque characteristic.

The same function will be observed also in case when the hub 11 is twisted in the reverse direction of $X_1$, and an angle where the roller 15 reaches a position of phantom line 15" corresponds to the maximum twist angle (twist angle: $-\theta_1$). The relationship between a twist angle $\theta$ and a twist torque T of the above function will be shown by a curve A of FIG. 5 (hysteresis torque is not shown).

When the disc is rotating at high speed, the tension of the belt 30 will increase because the roller 21 of FIG. 2 is moved toward toward the outer peripheral side of the disc by centrifugal force and the compression of elastic body 20. As a result, the twist torque T in relation to the twist angle $\theta$ will become large as compared with that generated at low rotating speed to give a relational curve B of FIG. 5, for example.

Effect of the Invention

In this invention, plural stopping parts (for example, the roller 21) are provided on flanges 13,13 and pressing parts (for example, the roller 15) are provided on disc plate 16 and disposed between the stopping parts in the circumferential direction of the disc. A flexible member (for example, the steel belt 30) is laid over each stopping part and under the pressing parts between the stopping parts. The the tension of the flexible member is made elastically changeable by interposing the elastic member (for example, the elastic bodies 20, 32 and 33) in at least any one of the spaces between the stopping part, the pressing part and the flexible member. The following advantages are obtainable:

(a) Since a wide twist angle characteristic which has been impossible in conventional designs can be realized, a torsion damper disc having a high vibration absorbing performance is obtainable.

(b) Since the twist torque changes progressively in relation to an increase in the twist angle, the damper disc is superior in an absorbing ability of torsional vibration.

Another embodiment (a) By disposing the rollers 15 inside the rollers 21 so that rollers 15 do not contact with rollers 21 when twisting occurs, it possible to further enlarge the twist angle.

(b) An elastic body similar to elastic body 20 may be interposed between pins 14 and rollers 15. In this case, if at least this elastic body is provided at any one of places on the belt 30, between the pin 14 and the roller 15, or between the pin 19 and the roller 21, the invention will be effective. Therefore, this invention can be embodied even when the belt 30 is not molded with the elastic bodies 32 and 33.

(c) The flanges 13,13 serving as a guide for preventing the belt 30 from running out of the rollers. Lugs may further be formed on the rollers 15 and 21 to hold the belt 30 therebetween. Moreover, in case when a wire is employed for the belt 30, annular grooves may be formed on the rollers 15 and 21.

(d) Rollers 21 may or may not be rotatable.

(e) The flanges 13,13 may be formed as a continuous disc rather than as radial propections (f) A friction damper may additionally be provided between the retaining plate 17 and the flange 13 and/or between the flange 13 and the disc plate 16.

What is claimed is:

1. A torsion damper disc for a friction clutch having a central hub, a disc plate approximately perpendicular to the center line of said central hub and rotatably supported by the central hub, said hub having an outward flange; characterized by stopping means comprising a plurality of stopping parts spaced equally radially from and equally circumferentially about said center line on one of said flange and said disc plate, and pressing means comprising a plurality of pressing parts spaced equally radially from and equally circumferentially about said center line and disposed between said stopping parts on the other of said flange and said disc plate, a flexible member laid over one of said stopping means and said pressing means and under the other of said stopping means and said pressing means and between said stopping means and said pressing means and elastic mounting means for mounting one of said stopping means and said pressing means for increasing, by centrifugal force, the radial spacing of said one of said stopping means and said pressing means so elastically mounted from said center line as the speed of said friction clutch and torsion damper is increased to increase the tension of said flexible member.

2. A torsion damper disc as set forth in claim 1, in which said disc plate is composed of a retaining plate and a clutch plate, said stopping parts comprise rollers, and each of said rollers is fitted onto and supported by a pin installed between said retaining plate and said clutch plate.

3. A torsion damper disc as set forth in claim 1, in which said pressing parts comprise rollers, each of said roller being rotatably supported by a pin parallel to a center line of the disc, said pins being supported by a pair of the flanges formed on said hub.

4. A torsion damper disc as set forth in claim 1, in which said flexible member comprises a continuous steel belt, said steel belt having a core and elastic bodies molded on the opposite surfaces of said core, said core material comprises a strip member of braided thin wires.

5. A torsion damper disc as set forth in claim 2, in which a cylindrical elastic body is interposed between said pin and said roller.

6. A torsion damper disc as set forth in claim 1, in which said stopping parts are provided on three equally spaced places in said circumferential direction of said disc, said pressing parts are also provided on three equally spaced places in said circumferential direction of said disc, said flexible member is formed as a continuous belt, an inner peripheral side of said flexible member is laid over the stopping part, and the pressing part is pressed on an outer peripheral side of said flexible member between said stopping parts.

* * * * *